United States Patent Office 3,115,994
Patented Dec. 31, 1963

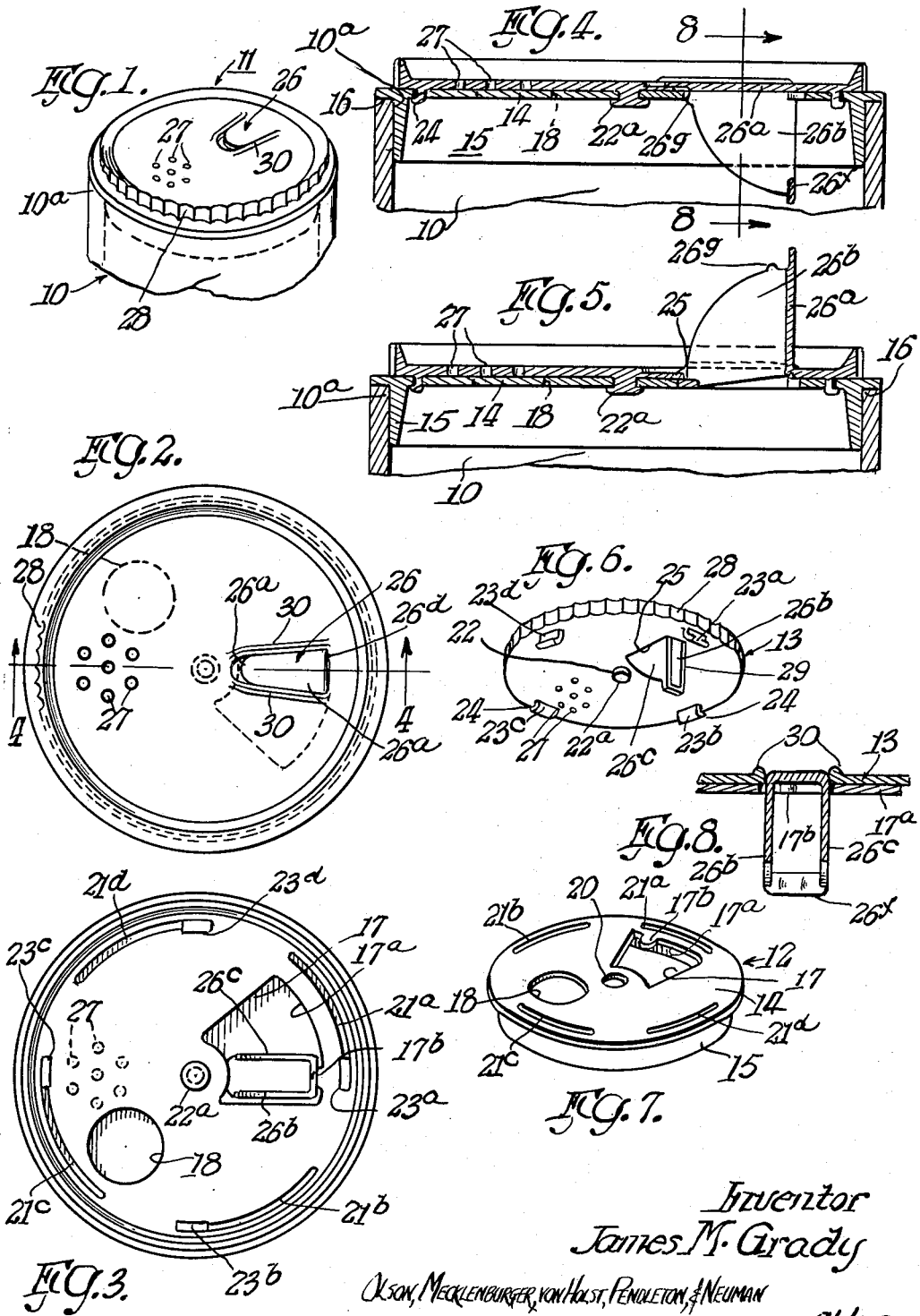

1

3,115,994
DISPENSING APPARATUS
James M. Grady, Mount Prospect, Ill., assignor to Morton
Salt Company, Chicago, Ill., a corporation of Illinois
Filed Mar. 10, 1961, Ser. No. 94,914
2 Claims. (Cl. 222—480)

This invention relates to a dispensing apparatus adapted primarily for use in dispensing table salt, flour, sugar, or the like.

In utilizing such apparatus, problems have oftentimes been encountered in effectively preventing leakage of the container contents through such dispensing apparatus. Problems of leakage are particularly prevalent during handling of the container while being shipped in commerce.

Various dispensing apparatus have heretofore been employed which incorporate a pair of apertured relatively adjustable elements; the latter, when in one position of adjustment, being capable of dispensing the container contents in a plurality of streamlets and when in a second position of adjustment, being capable of dispensing the container contents by pouring through a relatively large single opening. It has been found in such prior apparatus that they are beset with a serious shortcoming whereby the relatively adjustable elements are susceptible to accidental adjustment, caused by vibration or the like, in which case the openings in the apparatus are uncovered thereby permitting the container contents to be dispensed or to be exposed to dirt, or moisture.

Numerous attempts have been made to rectify this situation by the employment of stickers or wedges to prevent such relative adjustment. Such efforts, however, have proven unsatisfactory because of the increased cost and awkwardness involved in initially applying such sticker or wedge. Furthermore, once the sticker is ruptured or the wedge removed the aforenoted shortcoming possessed by the apparatus once again becomes a factor.

Thus, it is one of the objects of this invention to provide an improved dispensing apparatus which eliminates the shortcoming possessed by the prior art structures.

It is a further object of this invention to provide an improved dispensing apparatus which requires a positive manual act to effect a relative adjustment of the elements. It is a still further object of this invention to provide an improved dispensing apparatus which is simple in construction, inexpensive to produce, and effective in operation.

Further and additional objects will appear from the description, accompanying drawings, and appended claims.

In accordance with one embodiment of this invention a dispensing apparatus is provided which includes a pair of apertured elements arranged in substantially superposed relation. The uppermost of said elements is mounted for relative rotational adjustment with respect to the other element. The axis of rotation of the upper element is coincident to the centrally disposed transverse axis of the lower element. The lower element is provided with an enlarged aperture offset from its transverse axis. A segment of the aperture's perimeter, disposed adjacent the outer periphery of the lower element, it of arcuate configuration and has the center of curvature thereof coincident with the central transverse axis of the element.

2

The arcuate perimeter segment is provided with a protuberance disposed adjacent to but spaced from one end limit of said segment. The upper element is provided with an opening which is adapted to be in continuous registration with the lower element enlarged aperture regardless of the rotational adjustment of said upper and lower elements. Hingedly connected to the upper element adjacent one side of the opening therein provided is a spout element. The spout element includes a base portion, which is adapted to overlie and close off the upper element opening. Extending angularly from the base portion of the spout element is a side portion which is adapted to project through the registered opening and aperture of the upper and lower elements respectively when the spout element is in its overlying and closing off position. The side portion, when the spout element is in its overlying and closing off position, is adapted to frictionally engage the protuberance formed on the perimeter of the enlarged aperture of the lower element and restrain the upper element against rotational movement with respect to the lower element.

For a more complete understanding of this invention reference should be made to the drawing wherein:

FIGURE 1 is a fragmentary perspective view of the improved dispensing apparatus and showing the spout element in its overlying and closing off positions;

FIG. 2 is an enlarged top plan view of FIG. 1;

FIG. 3 is a bottom view of FIG. 2;

FIG. 4 is a sectional view taken along line 4—4 of FIG. 2;

FIG. 5 is similar to FIG. 4 but showing the spout element in its fully opened position;

FIG. 6 is a reduced perspective view of the uppermost element shown in disassembled relation;

FIG. 7 is a reduced perspective view of the lowermost element shown in disassembled relation; and FIG. 8 is a fragmentary sectional view taken along line 8—8 of FIG. 4.

Referring now to the drawings and, more particularly, to FIG. 1, a cylindrically-shaped open-end container 10 is shown which is of a type suitable for holding table salt, sugar, flour, or the like. Mounted in overlying relation on the open end 10a of the container is an improved dispensing apparatus 11. The container 10 may vary in size and shape from that shown but, preferably, should be of such a configuration that it may be readily manipulated by hand, so as to dispense the contents from the container either by pouring through a single large opening or by sifting through a plurality of perforations.

The dispensing apparatus 11, in this instance, comprises two complementary members 12 and 13. Member 12 is preferably of a molded relatively stiff plastic material and disc-shaped. Member 12 has a flat upper surface 14 and an annularly-eshaped flange 15 depending from the underside thereof. The flange 15 is spaced inwardly a slight amount from the periphery of surface 14 so as to form a shoulder 16 against which the open end 10a of container 10 is adapted to bear (see FIGS. 4 and 5). The depending flange 15 may be secured by any suitable means, such as adhesive or the like, to the interior surface of container 10. Top surface 14 of member 12 is provided with an elongated arcuate-shaped, or circular ring sector shaped first opening 17 which has the center of curvature thereof coincident with the transverse center axis of member 12. The outer segment 17a of the perimeter of opening 17, which is of arcuate configuration, is provided with a protuberance 17b. The protuberance 17 is disposed adjacent to but spaced from the end limit of segment 17a and extends inwardly in a radial direction a short distance. The function of protuberance 17b will be discussed more fully hereinafter.

Angularly spaced from and disposed on substantially the opposite side of the transverse center axis is a second opening 18. The function of these two openings 17 and 18 will become apparent from the discussion to follow hereinafter. Symmetrically disposed about, and adjacent to, the periphery of surface 14 are a plurality of thin, elongated, arcuate-shaped slots 21a, 21b, 21c and 21d. Each of the slots is substantially the same length and has the center of curvature thereof coincident to the transverse axis of member 12. A small opening 20 is provided at the center of surface 14 and such opening 20 has the central axis thereof coincident to the transverse center axis of member 12.

Member 13 is preferably formed of a molded, relatively pliable, plastic material and, as seen more clearly in FIG. 6, is provided with a center depending stud 22 which is adapted to be frictionally accommodated in opening 20 of member 12. The end 22a of the stud which projects beyond opening 20 is peened over, or enlarged, as shown, so as to effect interlocking of members 12 and 13. In addition, there is provided, adjacent the outer periphery of member 13, a plurality of symmetrically arranged depending lugs 23a, 23b, 23c, and 23d, which are adapted to be slidably accommodated in corresponding slots 21a–d formed in member 12. The lower end 24 of each lug is offset laterally a slight amount, as shown in FIGS. 4 and 5, so as to effect a snap-in engagement with the slot. The length of each of the slots 21a–d, as aforementioned, is the same and determines the limits to which member 13 may be rotated relative to member 12 in either a clockwise or counter-clockwise direction. Member 13 is provided with an enlarged opening 25, which is adapted to remain in continuous registered relation with arcuate opening 17 of member 12, regardless of the position of rotational adjustment of member 13.

Hingedly mounted on a portion of member 13, circumjacent opening 25, is a spout piece 26 which is provided with a base portion 26a and a pair of quadrantal-shaped side portions 26b and 26c projecting in substantially the same direction from opposite peripheral sides of said base portion, as seen more clearly in FIG. 5. One end 26d of base portion 26a, in this instance, is integrally connected to the circumjacent portion of member 13 and provides the axis about which element 26 hinges. The opposite end 26e of base portion 26a protrudes beyond the periphery of opening 25 and forms a finger tab to facilitate manipulating the element to its open position, such as shown in FIG. 5.

The side portions 26b and 26c are adapted to frictionally engage the periphery of opening 25 and cooperate with base portion 26a to provide a suitable pouring spout when element 26 is disposed in its open position. The lower edge limit of side portions 26b and 26c are interconnected by a bridging segment 26f which functions as a stop when the element is in its fully open position (see FIG. 5). Each side portion 26b or 26c is provided with a protuberance 26g which is spaced from, but close to, tab 26e and is adapted to cooperate with the latter to effect locking of the element 26 in its closed position, such as shown in FIG. 4.

When spout member 26 is in its closed position, see FIGS. 2, 3, and 4, the base portion 26a completely overlies and closes off opening 25. Furthermore, when member 13 has been rotated in a counter-clockwise direction to its fullest extent to the position shown in FIG. 2, the side portions 26b and 26c of the spout piece 26 straddle protuberance 17b. The straight edge 29 of the side portion 26b when the spout piece is in its closed position will engage the protuberance if an attempt was made to rotate the spout piece in a clockwise direction, and thus will frictionally restrain such movement of the spout piece. Thus, the protuberance 17b in combination with the edge 29 of side portion 26b, provides an effective means for preventing accidental rotation of the upper member 13, when the latter is in the position shown in FIG. 2 and the spout piece is in its closed position.

Angularly spaced from opening 25 are a plurality of perforations 27 which are formed on member 13. The perforations 27 are arranged in close proximity to one another so as to form a group. The arrangement of the perforations 27 in the group is such that all of the perforations will be in registration with the second opening 18 of member 12 only when the member 13 is rotated in a clockwise direction to its fullest extent. When member 13 has been rotated fully in a clockwise direction and spout piece 25 is in its closed position, the contents of the container may be dispensed by way of sifting through perforations 27.

The periphery of member 13 is provided with an upwardly extending flange 28 which has the outer surface thereof knurled or serrated, so as to facilitate rotational manipulation of member 13 in either a clockwise or counter-clockwise direction with respect to member 12. In order to reinforce the portions of member 13, circumjacent opening 25, a pair of elongated ribs 30 are provided, see FIGS. 2 and 8.

As aforenoted, both members 12 and 13 may be readily molded, thereby minimizing the cost of such apparatus. In the case of member 13, the spout element 25 may be molded simultaneously with the remainder of the member.

It is to be understood, of course, that the size and shape of members 12 and 13, as well as the openings formed therein may be readily varied from that shown without departing from the scope of this invention.

Thus, it will be seen that a simple, inexpensive and efficient dispensing apparatus has been provided which includes an effective means for preventing accidental adjustment of one part thereof relative to the other.

While several embodiments of this invention have been described above, further modifications may be made thereto and it is contemplated, therefore, by the appended claims, to cover any such modifications as fall within the true spirit and scope of this invention.

I claim:

1. A dispensing apparatus comprising a first member provided with an aperture disposed in offset relation with respect to a central transverse axis of said first member, said aperture having a first segment of the perimeter thereof, adjacent the periphery of said first member, of arcuate configuration whereby the center of curvature is substantially coincident with said central transverse axis; said first perimeter segment being provided with a protuberance disposed adjacent to but spaced from one end limit of said first perimeter segment, and a second member mounted in overlying relation on said first member for limited rotary movement with respect thereto about said central transverse axis; said second member being provided with an opening in continuous registered relation with said first member aperture, and a spout element hingedly connected to a segment of said opening perimeter and having a base portion, and a side portion extending angularly therefrom through said opening; said spout element when in a closed position having the base portion thereof overlying and closing off said opening; said protuberance engaging said side portion so as to restrain relative rotational movement between said first and second members in one direction of rotation, and said side portion engaging a second segment of the perimeter of the aperture of said first member so as to restrain relative rotational movement between said first and second members in the other direction of rotation when said base portion is overlying and closing off said opening.

2. The dispensing apparatus of claim 1 in which said first member has a second aperture angularly spaced from the aperture provided with said protuberance and said second member has a second opening angularly spaced from said first opening; said second aperture and second opening being in superposed registration when said second member is at one end limit of rotational adjustment with respect to said first member.

References Cited in the file of this patent

UNITED STATES PATENTS

| | | |
|---|---|---|
| 1,959,874 | Mills | May 22, 1934 |
| 2,554,710 | Leccese | May 29, 1951 |
| 2,777,615 | De Shazor | Jan. 15, 1957 |
| 2,839,230 | Pottle | June 17, 1958 |
| 2,964,047 | Jackson et al. | Dec. 13, 1960 |

FOREIGN PATENTS

| | | |
|---|---|---|
| 26,128 | Great Britain | Nov. 10, 1910 |